Nov. 15, 1927.
A. HARRISON
1,649,112
SAFETY CONTROL RETARD GAUGE
Filed June 28, 1924    2 Sheets-Sheet 1
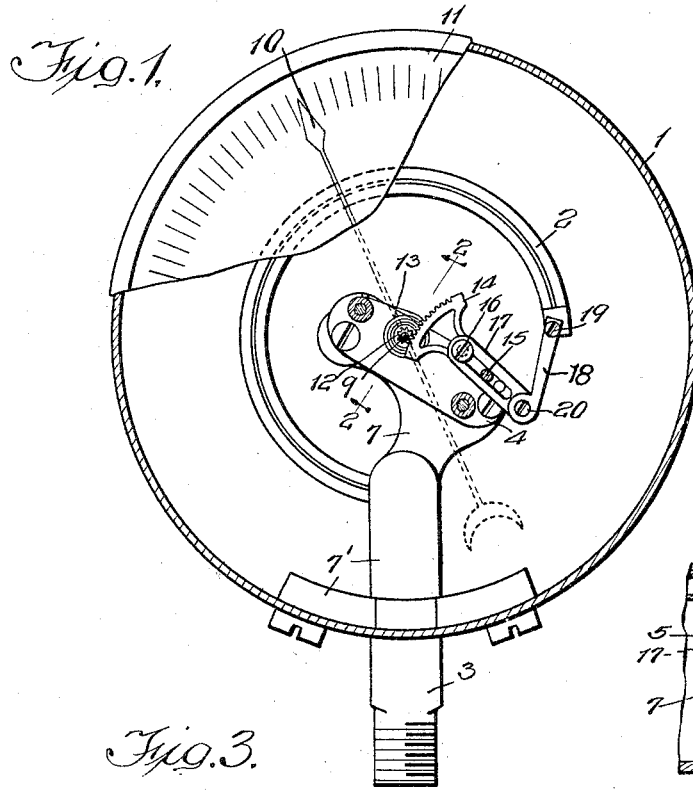

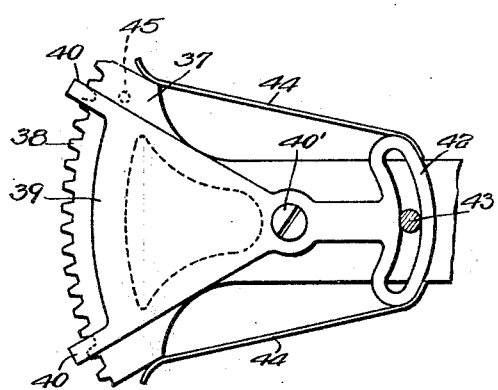
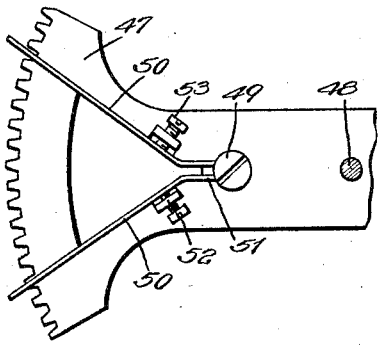
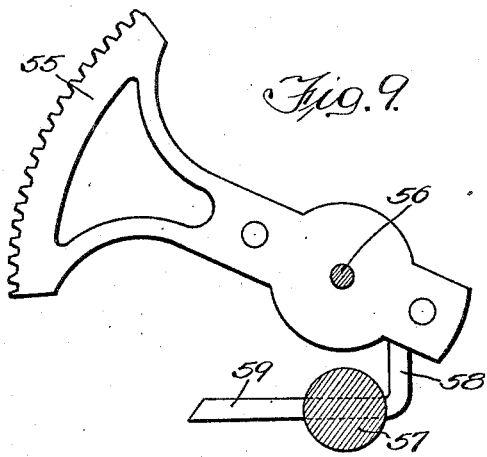
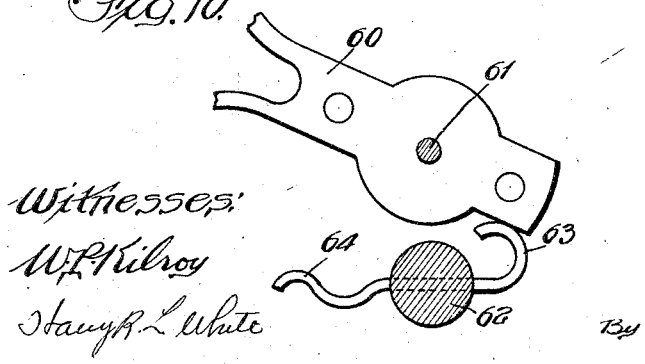

Patented Nov. 15, 1927.

1,649,112

UNITED STATES PATENT OFFICE.

AMOS HARRISON, OF CHICAGO, ILLINOIS, ASSIGNOR TO JAS. P. MARSH AND COMPANY, OF CHICAGO, ILLINOIS, A CORPORATION OF ILLINOIS.

SAFETY CONTROL RETARD GAUGE.

Application filed June 28, 1924. Serial No. 723,013.

My invention belongs to that general class of devices known as gauges, and relates more particularly to a gauge so constructed that the sector will not disengage from the pinion, or the spring be strained or set and which may in addition be constructed to yieldingly retard the operation of the Bourdon spring or the like so as to afford a relatively large and small travel of the indicator between certain points. The invention has among its objects the production of a gauge of the kind described which is simple, durable, reliable, accurate, efficient, inexpensive and satisfactory for use wherever found applicable. It has particularly as an object the production of a gauge that will not easily get out of order and which may be assembled at a minimum expense. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of a gauge mechanism, a portion of the dial removed to show the construction;

Fig. 2 is a sectional view taken substantially on line 2—2 of Fig. 1;

Fig. 3 is a plan view of a portion of a sector, illustrating the simplest form of the device;

Fig. 4 is a similar view illustrating another type;

Figs. 5, 6, 7 and 8 are similar views illustrating another type; and

Figs. 9 and 10 are similar views illustrating another type.

Referring to the drawings, 1 represents a shell or casing of suitable size, shape and material, and stamped, cast or otherwise constructed. Arranged within the casing is suitable pressure control or actuating mechanism, that shown comprising a Bourdon spring 2 communicating with the tubular stem 3 arranged for attachment in a system in the usual manner. Arranged within the case is a movement frame, usually consisting of the bars 4 and 8 secured together by suitable spacers and bolts 5 and 6 or the equivalent, and secured either to the casing or to some other convenient point; for example, to the part 7 formed on the tubular casting 7' secured in the casing and which supports the Bourdon spring 2 and connects the same to the pipe 3. The frame carries the spindle or pinion shaft 9, on the outer end of which is arranged the usual indicator 10, 11 being a dial arranged below the indicator. As shown, the spindle 9 is provided with a pinion 12 arranged to mesh with the teeth on a sector 14, 13 being the usual hair spring tending to pull the spindle in a direction to cause the indicator 10 to return to zero or a desired neutral point. As shown, the sector 14 is pivotally secured to the frame by a shaft 15. The same is also provided with a cooperating arm portion 17 secured thereto by a screw 16. This part is also mounted on the shaft 15. As shown, the end of 17 is connected to the Bourdon spring by a link 18 pivotally secured to the parts at 19 and 20, as shown. The mechanism described is more or less common in gauges of this type, and may be varied in details without affecting the operation. Obviously, as the spring 2 expands or contracts, the same through the link 18 will rock the sector 14, which is in mesh with the pinion 12 and will thereby rock shaft 9 and actuate the indicator 10.

Referring particularly to Fig. 3, in which only a portion of the sector 14 is shown, 22 represents the teeth adapted to engage the pinion 12. In this particular construction, the sector is formed with a flat face 23, forming a stop at either end. When the sector is moved a distance so that the teeth of the pinion reach the end of the toothed part of the sector, the pinion will engage with the shoulder 23, preventing further movement of the sector.

In the construction shown in Fig. 4, 25 corresponds with the sector 14, and in this instance the sector is provided with projecting portions 26 so as to more positively engage the pinion with less possibility of injuring the pinion teeth. The construction shown in Fig. 5 is similar in result to that shown in Fig. 4, except in this case a member 28 is secured to the sector 24, the same having the projecting stop members 29. As shown, member 28 is slotted, as indicated at 31, and secured to the sector by screws 30. In this construction the stop member 28 may be adjusted on the sector so that the stopping points may be varied. The construction shown in Fig. 6 is similar, 32 representing the sector, but in this instance the stops 33 are independently mounted on the sector. In this case the parts are slotted, as for example, the members 33 and the same secured together by means of the small screws 34 or the equivalent. While these members 33 or either of them may be permanently secured to the sector, by making them independently adjustable, they may be set as desired.

A slightly modified construction is shown in Fig. 7, in which 37 represents the sector provided with the usual teeth 38. In this case, a stop member 39 provided with the stops 40 is adjustably mounted on the sector. As shown, the same is pivotally secured thereon at 40′. The end of the member 39 opposite the stops 40, is provided with a slotted end 42 and arranged over the pin 43 which corresponds to the shaft 15 previously described. To the stop member is secured the springs 44, which are arranged to cooperate with the sector 37. Obviously, between the stops 40 the sector and pinion will work freely together, but when the stops 40 are engaged, further movement of the mechanism will be yieldingly opposed. This will prevent jar or strain on the pinion shaft and this may be utilized as a retard. The retarding obviously will depend upon the strength of the springs 44. If it is desired to retard or resiliently stop only in one direction, a pin 45 or the equivalent may be provided (indicated in dotted lines in Fig. 7), but generally speaking the double retard or retarding in either direction is desired.

In the construction shown in Fig. 8, 47 represents the sector arranged on the shaft 48, 49 representing the pin or screw corresponding to 16 in Fig. 1. In this case a spring 50 is mounted on the sector, the same being of sufficient length to project beyond the sector teeth similar to the stops 40. In this case lugs 52 are provided on the sector, the spring 50 extending between them and around the screw 49, as indicated at 51. Adjusting screws 53 provide means for adjusting stops and likewise varying the calibration of the instrument.

In Fig. 9, the sector is shown mounted on the post or shaft 56, while the post 57 carries a spring member provided with a portion 58 adapted to engage the sector arm and a portion 59 adapted to engage the sector when moving it in the opposite direction. As the spring or stops are shown in this figure, 58 is somewhat rigid, while the portion 59 is more resilient. In Fig. 10, the sector 60 is shown pivotally mounted at 61 and arranged to engage the spring 63—64 mounted on the post 62. While in the construction shown in Fig. 9 the spring portion 58 is more or less rigid, as was also the part 59, the spring shown in Fig. 10 is more yielding.

With all of the constructions shown, the movement will be checked when the pointer reaches a predetermined point. When checked by the mechanism shown in Figs. 3, 4, 5 and 6, the checking is positive, while in the constructions shown in Figs. 7, 8, 9 and 10, the checking is cushioned. This cushioning effect may be utilized in providing a retard of the movement after a predetermined travel of the indicator. It is thus possible to provide a gauge having a dial portion of a considerable open reading and then a limited movement of the pointer after further movement of the mechanism.

The application of the various improvements can be applied to any make of high or low pressure gauges or in altitude gauges where a steady movement of the pointer is desired. One of the principal advantages of the construction and improvement is that it saves the spring and mechanism in case of a sudden excessive pressure upward or drop downward. The Bourdon spring is saved under such violent conditions which may happen in connection with the gauge when used on almost any kind of service.

The improvements may be embodied in a pressure gauge, a vacuum gauge, or a compound gauge arranged to indicate both pressure and vacuum. In some instances, the engaging means on the sector will engage the pinion, while in others the gauge might be designed so that the shaft is engaged. It is immaterial whether the projecting parts engage the pinion itself, the shaft, or an equivalent stop or stops serving the same purpose. While the pinion shaft and pinion are rotatable, they nevertheless form what might be termed a stationary stop in so far as concerns their engagement with the abutments or stops provided on the gear sector. While ordinarily no injury results from employing the pinion shaft to stop the sector, a supplemental stop or stops may be employed on the movement to produce the same result, as indicated at 17 in Fig. 2, in which two upstanding pins or lugs are shown which will not interfere with the teeth on the sector but may be engaged by the stops on the sector whether of the type shown in Fig. 4 or in Figs. 5 to 8.

Having thus described my invention, it is obvious that various immaterial modifications may be made in the same without departing from the spirit of my invention;

hence I do not wish to be understood as limiting myself to the exact form, construction, arrangement and combination of parts herein shown and described or uses mentioned.

What I claim as new and desire to secure by Letters Patent is:

1. In a gauge, indicating mechanism, a pressure controlled tubular spring and means for operatively connecting said indicating mechanism and spring, including a pinion and shaft assembly and an actuating gear sector therefor having external gear teeth, in combination with means projecting beyond the teeth of said gear sector for engaging the pinion shaft assembly to limit the movement thereof.

2. In a device of the kind described and in combination, a casing, indicating mechanism arranged therein, a pressure actuated mechanism, a support for the fluid actuated mechanism, connecting means between said indicating mechanism and fluid actuated mechanism, including a frame mounted on said support, a pinion connected with the indicating mechanism, an actuating gear sector in mesh with said pinion and pivoted on the frame, and means for operatively connecting the pressure actuated mechanism and gear sector, and resilient means carried by the sector for engaging the pinion and retarding the operation of the gear sector after the same has moved a predetermined distance in either direction.

3. In a gauge of the kind described and in combination, indicating mechanism, pressure controlled mechanism, connecting mechanism between the indicating and pressure controlled mechanism including a pinion positively connected with the indicating mechanism and a gear sector intermeshing therewith operatively connected with the pressure actuated mechanism, means for supporting said indicating mechanism, said pressure controlled mechanism and said gear sector, a spring arranged to yieldingly oppose the operation of said pinion and retrieve the same to neutral position, and means carried by the sector and cooperating with the pinion arranged to supplement said first spring and yieldingly oppose continued movement of the sector and pinion after predetermined movements thereof.

4. A gauge movement of the kind described comprising a pair of spaced frame bars, a pinion and pinion shaft carried thereby, a gear segment arranged between said bars and carried thereby, said gear sector having external teeth and a part mounted on the sector and having an extending part projecting beyond said teeth a distance to engage the pinion after a predetermined movement of the sector.

5. In a device of the kind described and in combination, indicating mechanism, a pressure controlled mechanism, connecting means between said indicating mechanism and pressure controlled mechanism including a pinion and shaft therefor and an actuating gear sector in mesh therewith, means for supporting said indicating mechanism, said pressure controlled mechanism and said gear sector, and means adjustably carried by said sector and engageable with said pinion for limiting the movement of the gear sector and pinion after a predetermined movement thereof.

6. In a device of the kind described and in combination, a casing, indicating mechanism arranged therein, a pressure controlled mechanism, connecting means between said indicating mechanism and pressure controlled mechanism, including a pinion and pinion shaft assembly and an actuating gear sector therefor in mesh therewith, means for supporting said indicating mechanism, said pressure controlled mechanism and said gear sector, and yieldable means carried by said sector and cooperable with said pinion shaft assembly for yieldingly opposing the operation of the gear sector after same has moved a predetermined distance, consisting of adjustable means provided with projecting parts beyond the gear face of the sector for engagement with said pinion shaft assembly.

7. In a device of the kind described and in combination, a casing, indicating mechanism arranged therein, a pressure controlled mechanism, connecting means between said indicating mechanism and pressure controlled mechanism including a pinion and pinion shaft assembly, and an actuating gear sector therefor in mesh therewith, means for supporting said indicating mechanism, said pressure controlled mechanism and said gear sector, and yieldable means carried by said sector and cooperable with said pinion shaft assembly for yieldingly opposing the operation of the gear sector after same has moved a predetermined distance, consisting of yieldable adjustable means provided with projecting parts beyond the gear face of the sector for engagement with said pinion shaft assembly.

8. In a device of the kind described and in combination, a casing, indicating mechanism arranged therein, a pressure controlled mechanism, connecting means between said indicating mechanism and pressure controlled mechanism including a pinion and pinion shaft assembly, and an actuating gear sector therefor in mesh therewith, means for supporting said indicating mechanism, said pressure controlled mechanism and said gear sector, and yieldable means carried by said sector and cooperable with said pinion shaft assembly for yieldingly opposing the operation of the gear sector after same has moved a predetermined distance, consisting of a means mounted on the sector and projecting beyond the toothed edge thereof, and means for adjustably securing the same on the sector.

9. In a device of the kind described and in combination, indicating mechanism, a pressure actuated mechanism, connecting means between said indicating mechanism and fluid actuated mechanism, including a pinion and an actuating gear sector in mesh therewith, resilient means carried by said sector and engageable with said pinion shaft mechanism for limiting the movement of the gear sector and pinion after a predetermined movement thereof, and means carried by the sector for adjusting the resilient means.

In testimony whereof, I have hereunto signed my name.

AMOS HARRISON.